United States Patent [19]

Fattore, Jr. et al.

[11] 4,330,184
[45] May 18, 1982

[54] CAMERA-OPERATING DEVICE

[75] Inventors: James T. Fattore, Jr., Seattle; Robert L. Fattore, Renton; William R. Angevine, Edmonds; John R. Spence, Mountlake Terrace, all of Wash.

[73] Assignee: Photo-tronics, Inc., Seattle, Wash.

[21] Appl. No.: 183,370

[22] Filed: Sep. 2, 1980

[51] Int. Cl.³ .................. G03B 17/38; G03B 17/42; G03B 29/00
[52] U.S. Cl. ................... 354/81; 354/173; 354/266; 354/293
[58] Field of Search ............ 354/171, 173, 75, 76, 354/81, 64, 65, 67, 212, 266–269, 288, 293, 295

[56] References Cited

U.S. PATENT DOCUMENTS 2,944,474  7/1960  Dennis ................... 354/64
4,180,316  12/1979  Della-Calce ............ 354/173

FOREIGN PATENT DOCUMENTS 1352183  5/1964  France .

Primary Examiner—L. T. Hix
Assistant Examiner—William B. Perkey
Attorney, Agent, or Firm—Seed, Berry, Vernon & Baynham

[57] ABSTRACT

A remotely located camera has a motor unit adjacent the camera-operating controls; namely, a shutter release button and a film advance lever. A ramp is mounted on a plate which is fixed to the motor shaft, with a film lever advance post also on the plate. Motor-reversing switches are located in circumferentially spaced positions about the plate, with the plate having switch actuators arranged to cause rotation of the plate to move the ramp to depress the button and release the film, then reverse the plate to move the post against the film lever to advance the film and then to again reverse the motor to bring the plate back to a home or start position.

5 Claims, 5 Drawing Figures

CAMERA-OPERATING DEVICE

BACKGROUND OF THE INVENTION

1. Field of the Invention

This invention relates to remotely located cameras and to controls for automatically depressing the shutter and advancing the film in such cameras.

2. Description of the Prior Art

Various types of shutter release and film advance mechanisms have been utilized heretofore for actuating the controls on a remote, frequently hidden camera. These types of cameras are frequently used as security or surveillance cameras in banks or other high-security regions. It is desirable in these types of cameras to be able to take a sequence of pictures rapidly and quietly so that the intruder or robber is unaware that the photographs are being taken and that a sufficient number of photographs are taken so that at least one or more of the shots are available to provide good identification of the person photographed. Since a large number of these cameras may be installed at any one location, it is also desirable that the mechanism be easily maintained and inexpensive to manufacture. Various types of camera actuators heretofore known are described in U.S. Pat. Nos. 4,180,316 and 3,672,269, and French Pat. No. 86.190. Generally, these devices have not been satisfactory because of the difficulties in maintenance, speed of operation, and unsuitability for modern camera shutter release and film advance mechanisms.

SUMMARY OF THE INVENTION

It is an object of this invention to provide a remote shutter control and film advance mechanism which is inexpensive to manufacture and rapid and quiet in operation.

It is another object of this invention to provide a remote shutter and film advance mechanism which uses inexpensive electrical controls for its operation.

Basically, these objects are obtained by providing a motor housing which is mounted adjacent the camera and facing the camera shutter button and film advance lever, and providing plate means on the motor shaft having, first, shutter button release means extending toward the camera and, second film advance lever means extending toward the camera with suitable electrical control means which will rotate the plate means in one direction first to depress the shutter button and release the film, then to reverse the direction of the plate means to move the film advance lever and advance the film, and finally to again reverse the plate means to return it to a home or start position, where it automatically repeats the cycle or rests until ready to be reactivated. In the preferred embodiment, the shutter release button is engaged by a ramp, and the film advance lever by a post on the plate means, with control of the extent of rotation of the plate means and direction of rotation being provided by switches and switch actuators around the plate means and on the plate means.

The controls and position of the shutter button actuating mechanism and film advance mechanism are such that numerous automatic repetitive high-speed and quiet cycles can be made without the need for manual intervention. Furthermore, the mechanism is relatively inexpensive to manufacture and operate at minimum maintenance time and expense.

DETAILED DESCRIPTION OF THE PREFERRED EMBODIMENT

Figure 1:
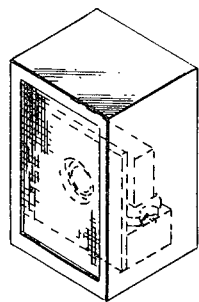
FIG. 1 is a schematic illustration of a typical hidden camera installation.
Figure 2:
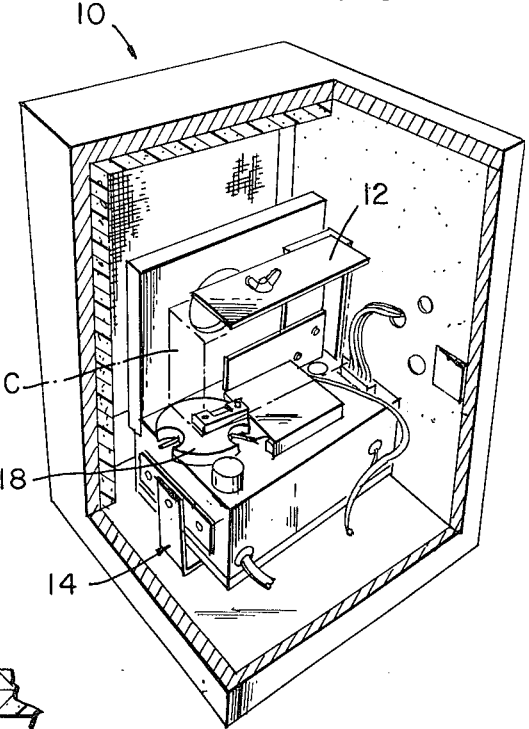
FIG. 2 is a perspective of a remote camera installation embodying the principles of the invention and with parts broken away for clarity.
Figure 5:
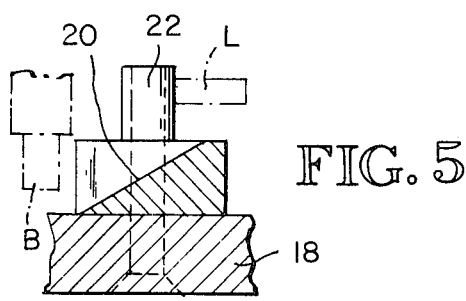
FIG. 5 is a detailed fragmentary section taken along line 5—5 of FIG. 4.
Figure 3:
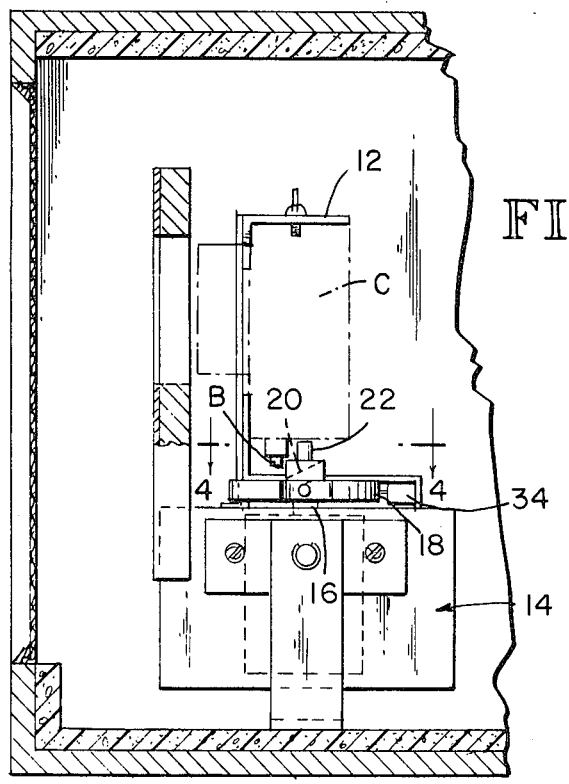
FIG. 3 is a side elevation of the camera actuator.
Figure 4:
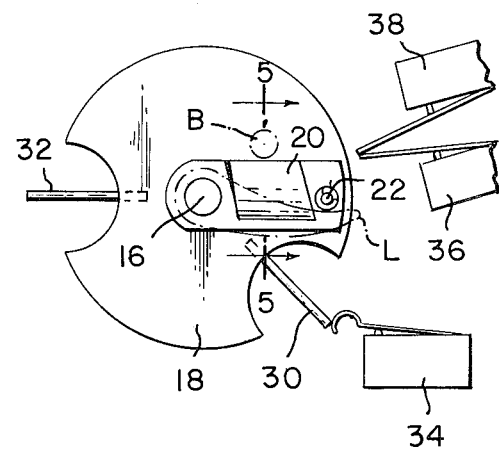
FIG. 4 is an enlarged fragmentary section taken generally along the lines 4—4 of FIG. 3.

As best shown in FIG. 1, the typical hidden camera installation sets the camera into a frame 10 which is hidden behind a picture or the like and contains a bracket 12 for holding the camera and a motor housing 14 which holds a reversible motor and electrical circuitry for operating and controlling the motor. The motor housing 14 and camera C are so positioned that the camera shutter button B and film advance lever L are closely adjacent the operating controls on the motor housing, as best shown in FIGS. 3 and 4.

The motor has a shaft 16 on which is fixed a generally circular plate 18. Fixed to the plate is a ramp 20 and a film lever advance post 22. As best shown in FIG. 4, the ramp slants outwardly so that upon counterclockwise rotation of the plate 18, the ramp engages the shutter release button, depressing the button to take the picture and release the film for advancing. Upon reverse rotation of the plate 18, the post 22 moves into engagement with the film advance lever L to cock the lever and advance the film. Then the plate is reversed again so that the post moves away from the film advance lever, allowing it to return; and either the cycle will repeat itself to take a sequence of pictures or the plate will come to a home position, ready to be initiated again.

It is important in operating the mechanism that the plate be rotated or oscillated through controlled distances to assure complete actuation of the shutter button and film advance lever, but be rapid enough to take a rapid sequence of photographs. In the preferred embodiment, the plate is provided with first and second switch actuators 30 and 32 fixed to the plate 18. A home or start switch 34 and operating switches 36 and 38 are circumferentially spaced around the plate. The switches are connected through conventional circuitry to allow energization of the motor from a remote switch, such as in a cash drawer or guard station, as is well known. The plate then rotates in the counterclockwise direction to depress the shutter button B until the switch actuator 30 engages switch 38. The switch 38 is positioned to stop the plate 18 after the button has been fully depressed and the film released. Actuating switch 38 also reverses the motor until the post 22 advances the film advance lever and switch actuator 32 engages switch 36. Switch 36 is positioned to reverse the motor again after the film advance lever has been fully advanced until switch actuator 30 reaches the home switch 34. In normal operation, the switch actuator 30 will reset the cycle to repeat itself until a sequence of pictures has been obtained, but may also be used to de-energize the motor until a new signal is sent from the remote warning switch location.

While the preferred embodiments of the invention have been illustrated and described, it should be understood that variations will be apparent to one skilled in the art. Accordingly, the invention is not to be limied to the specific embodiment illustrated in the drawing.

We claim:

1. A camera actuator comprising:

a frame;

means on the frame for supporting a camera, wherein the camera is of the type having a depressible shutter button and a film advance lever that is movable after the film is released by depressing the shutter button;

a motor housing mounted on the frame;

a rotatable motor shaft;

a reversible motor, positioned on the motor housing, for rotating the shaft in either direction;

plate means affixed to the shaft for depressing the shutter button and for advancing the film including
first means to depress the shutter button when the shaft is rotated in a forward direction, and
second means to engage the film advance lever to pivot the lever and to advance the film, after depressing the shutter button, when the shaft is rotated in a reverse direction; and control means for automatically actuating the motor to turn the shaft so that the shutter button is depressed, and then, the film is advanced.

2. The camera actuator of claim 1 wherein the first means included on the plate means includes
a ramp which slants outwardly from the plate means from an inner end that is flush with the plate means to an outer end that is adjacent the camera,
and wherein the control means actuates the motor
first, to rotate the shaft in a forward direction to move the ramp against the shutter button, thereby depressing the shutter button and releasing the film;
second, to rotate the shaft in a reverse direction, after depressing the shutter button, to move the second means against the film advance lever, thereby advancing the film; and
third, to rotate the shaft in a forward direction, after advancing the film, to return the shaft and plate means to their initial positions.

3. The camera actuator of claim 2 wherein the second means includes a post which extends outwardly from the plate means and which intersects the plane of movement of the film advance lever.

4. The camera actuator of claim 1 wherein the control means includes
a first switch to actuate rotation of the motor, shaft, and plate means as a unit in a forward direction from a starting position, thereby allowing the first means of the plate means to depress the shutter button;
a second switch to stop rotation of the unit in the forward direction, after depressing the shutter button, and to reverse the rotation so that the shaft rotates in a reverse direction, thereby allowing the second means of the plate means to pivot the film advance lever and to advance the film; and
a third switch to stop rotation of the unit in the reverse direction, after advancing the film, and to rotate the unit in the forward direction until stopped by contacting the first switch at the starting position.

5. The camera actuator of claim 4 wherein the plate means further includes two circumferentially spaced switch actuators positioned so that, after disengaging the first switch in the starting position, the first switch actuator rotates with the unit to engage the second switch while the shutter button is being depressed, thereby reversing the unit by engaging the second switch; then, wherein, after the shutter button is depressed, the second switch actuator moves with the plate means to engage the third switch while the film is being advanced, thereby reversing the unit a second time; and, then, wherein the first switch actuator engages the first switch to stop the unit in the starting position, after the shutter button has been depressed and the film advanced.

* * * * *